United States Patent
Üstün

(10) Patent No.: US 8,528,542 B2
(45) Date of Patent: Sep. 10, 2013

(54) HEAT EXCHANGER HAVING A VACUUM TUBE

(76) Inventor: Orhan Üstün, Bülach (CH)

( * ) Notice: Subject to any disclaimer, the term of this patent is extended or adjusted under 35 U.S.C. 154(b) by 401 days.

(21) Appl. No.: 10/592,982

(22) PCT Filed: Mar. 15, 2005

(86) PCT No.: PCT/CH2005/000155
§ 371 (c)(1),
(2), (4) Date: Jan. 18, 2008

(87) PCT Pub. No.: WO2005/088208
PCT Pub. Date: Sep. 22, 2005

(65) Prior Publication Data
US 2008/0245519 A1    Oct. 9, 2008

(30) Foreign Application Priority Data
Mar. 15, 2004    (WO) .................. PCT/CH2004/00152

(51) Int. Cl.
*F24J 2/05* (2006.01)
*F24J 2/26* (2006.01)

(52) U.S. Cl.
USPC .......................................... 126/652; 126/657

(58) Field of Classification Search
USPC ........................... 126/652, 443, 657; 165/178
See application file for complete search history.

(56) References Cited

U.S. PATENT DOCUMENTS

| | | | | |
|---|---|---|---|---|
| 3,960,136 A | * | 6/1976 | Moan et al. ................... | 126/647 |
| 4,059,093 A | * | 11/1977 | Knowles et al. .............. | 126/636 |
| 4,067,315 A | * | 1/1978 | Fehlner et al. ................ | 126/636 |
| 4,119,085 A | * | 10/1978 | Knowles et al. .............. | 126/636 |
| 4,133,298 A | * | 1/1979 | Hayama ........................ | 126/591 |
| 4,186,724 A | | 2/1980 | Nelson | |
| 4,198,955 A | * | 4/1980 | Dorbeck ....................... | 126/657 |
| 4,205,655 A | * | 6/1980 | Hunt ............................. | 126/635 |
| 4,232,655 A | * | 11/1980 | Frissora et al. ............... | 126/585 |
| 4,233,957 A | * | 11/1980 | Kenny .......................... | 126/652 |
| 4,259,946 A | * | 4/1981 | Roehm ......................... | 126/652 |
| 4,307,712 A | | 12/1981 | Tracy | |
| 4,440,156 A | * | 4/1984 | Takeuchi et al. ............. | 126/652 |
| 4,474,173 A | * | 10/1984 | Ford ............................. | 126/676 |
| 4,508,104 A | * | 4/1985 | Takeuchi et al. ............. | 126/653 |
| 4,674,477 A | * | 6/1987 | Tabor ............................ | 126/652 |
| 4,867,133 A | * | 9/1989 | Sadler ........................... | 126/663 |
| 5,572,987 A | * | 11/1996 | Moratalla et al. ............ | 126/652 |
| 6,619,283 B2 | * | 9/2003 | Ghela ............................ | 126/692 |
| 7,137,413 B2 | * | 11/2006 | Bauer et al. ................... | 138/39 |

* cited by examiner

FOREIGN PATENT DOCUMENTS

| | | |
|---|---|---|
| CN | 2470757 | 1/2002 |
| CN | 2485596 | 4/2002 |
| DE | 19859658 A1 * | 6/2000 |

*Primary Examiner* — Steven B McAllister
*Assistant Examiner* — Frances H Kamps
(74) *Attorney, Agent, or Firm* — The Webb Law Firm

(57) ABSTRACT

A heat exchanger comprises a vacuum tube with an outer wall. An inner tube can be filled with a heat-conducting fluid. The outer wall of the inner tube is situated concentric to a wall of the vacuum tube. At least one heat-conducting film is provided that joins said wall of the vacuum tube to the fluid-conducting tube system. A means which collects and concentrates solar energy is provided on the wall on the side of the vacuum tube facing away from the heat-conducting element. In addition, each heat-conducting element, while being pretensioned, presses against the wall of the vacuum tube and against the fluid-conducting tube system.

7 Claims, 5 Drawing Sheets

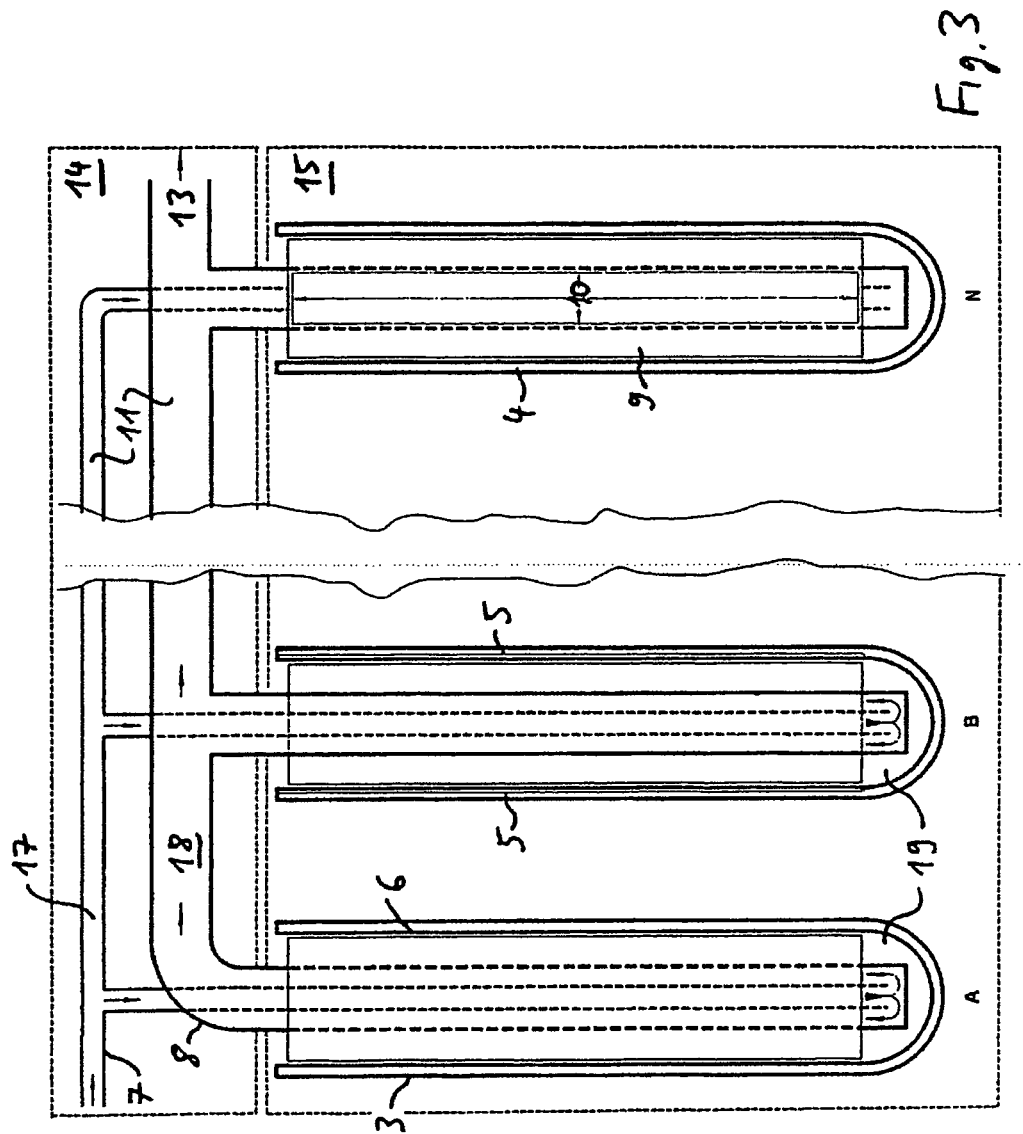

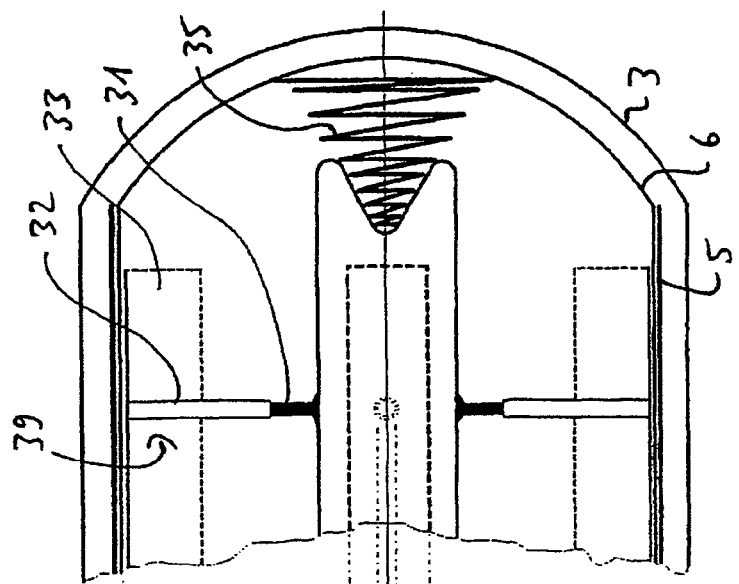
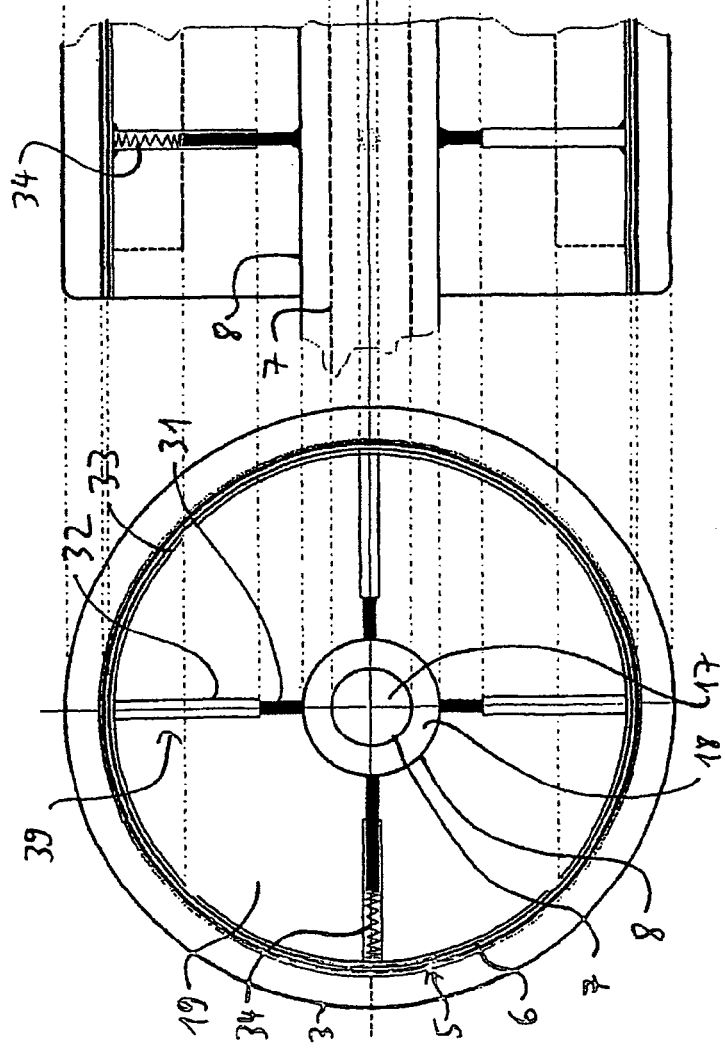

HEAT EXCHANGER HAVING A VACUUM TUBE

BACKGROUND OF THE INVENTION

1. Field of the Invention

The invention relates to a heat exchanger having a vacuum tube with an outer wall, and having an inner tube which holds a fluid and whose outer wall is arranged concentrically to the outer wall of the vacuum tube.

2. Description of Related Art

The heat exchanger having a vacuum tube is today the most important component for converting solar energy into heat energy in solar heating technology.

Such a heat exchanger is known, for example, from U.S. Pat. No. 4,186,724. The inner tube for holding the fluid is composed of two concentric tubes in which the fluid can flow in the counter-current mode. This inner tube is surrounded by an insulation space which is bounded at a distance from the fluid by the inner wall of the vacuum tube. The inner wall and the outer wall of the vacuum tube are arranged concentrically and form in cross section a ring, under a partial vacuum, around the inner tube.

U.S. Pat. No. 4,307,712 discloses a further heat exchanger of this kind, in which the inner tube is connected, as far as possible in an integral fashion, to transverse ribs in order to conduct heat better.

In the known heat exchangers, various reflection surfaces are inserted or various elements are blackened. The pipes of the fluid-conducting system are usually composed of a material which is a good conductor of heat. However, no elements are known which are provided for a good transfer of heat from such reflection surfaces to the fluid-conducting pipe system. The ribs which are known from U.S. Pat. No. 4,307,712 are complicated to connect to the fluid-conducting pipe system and do not have any connection to the partial vacuum tubes.

SUMMARY OF THE INVENTION

Taking this prior art as a starting point, the invention is based on the object of configuring a heat exchanger of the type mentioned at the beginning in such a way that the transfer of heat to the fluid-conducting system is increased.

A further objective of the invention is to avoid adverse ageing phenomena owing to oxidation effects, for example owing to the use of different (for example metal) materials in the individual tube systems, or condensation phenomena.

A heat exchanger according to the invention has a vacuum tube with an outer wall. A heat-conducting fluid can be filled into an inner tube of the heat exchanger. The outer wall of the inner tube is arranged concentrically to a wall of the vacuum tube. In this context, at least one heat-conducting film is provided which connects the aforesaid wall of the vacuum tube to the fluid-conducting pipe system. This at least one heat-conducting element presses in each case with prestress against the aforesaid wall of the vacuum tube and against the fluid-conducting pipe system.

The term vacuum tube is understood to mean an elongate volume system which can be placed under a partial vacuum in the operating state. The tubes can also in particular be cornered or polygonal.

Since a film which is a good conductor of heat and which extends in a helical shape in cross section connects the outer vacuum space, at which in particular the means which collect and concentrate solar energy is provided, to the fluid-conducting pipe system, a surprisingly simple embodiment is specified.

Further advantageous refinements are characterized in the subclaims.

BRIEF DESCRIPTION OF THE DRAWINGS

The invention will now be described in more detail by way of example using an exemplary embodiment and with reference to the appended drawings in which:

FIG. 3 shows a schematic illustration of a plurality of heat exchangers according to the invention, FIG. 5 shows a cross section through a heat exchanger according to yet another exemplary embodiment of the invention, and FIG. 6 shows a partial longitudinal section and side view of the heat exchanger according to FIG. 5.

DETAILED DESCRIPTION OF THE INVENTION

Figure 1:
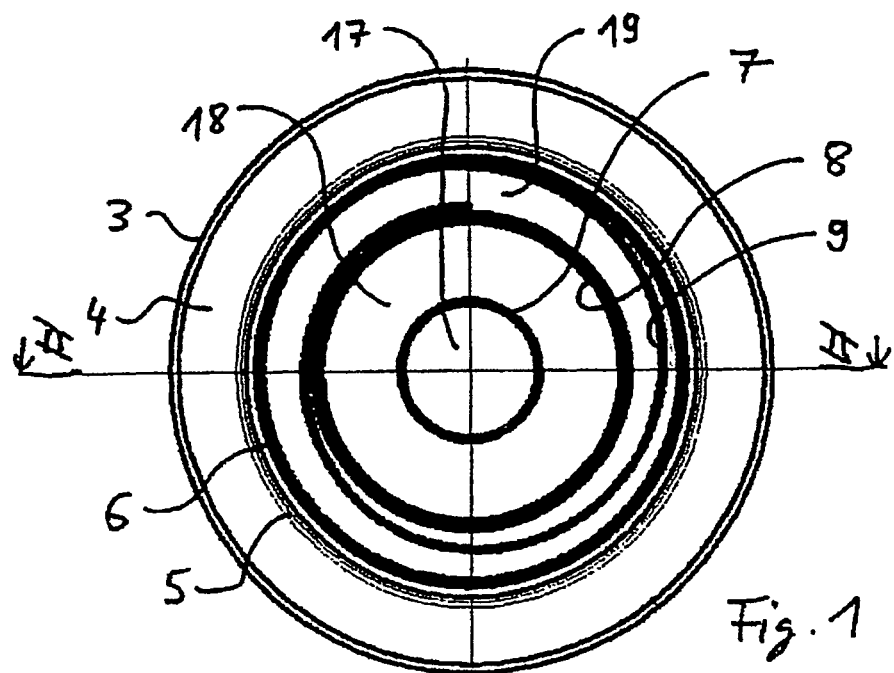
FIG. 1 shows a cross section through a heat exchanger according to one exemplary embodiment of the invention.
Figure 2:
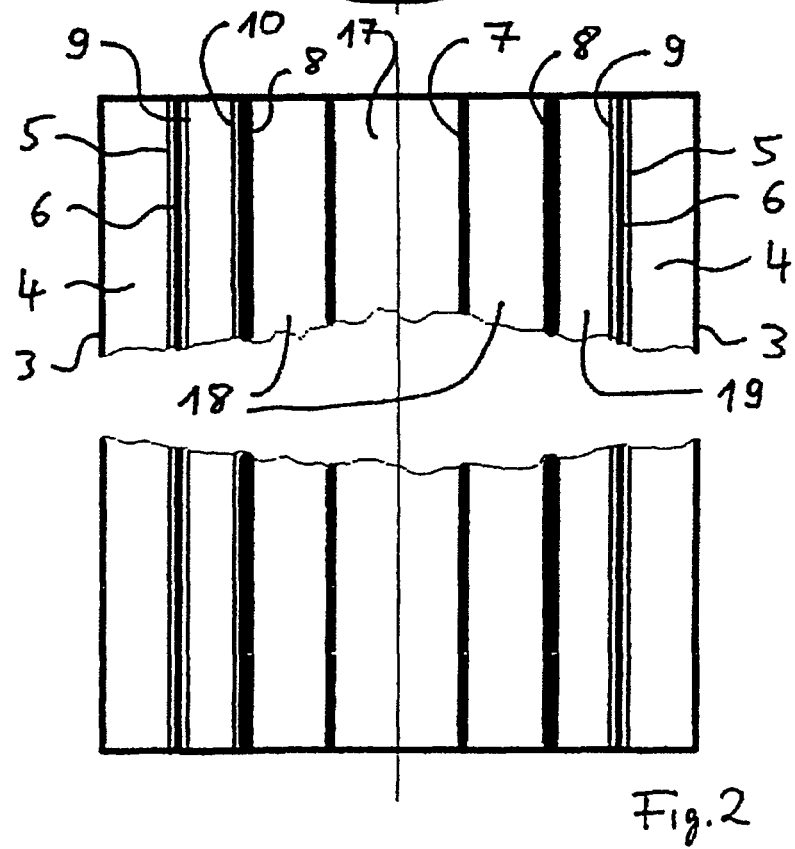
FIG. 2 shows a longitudinal section along the line II-II in FIG. 1.
Figure 1A:
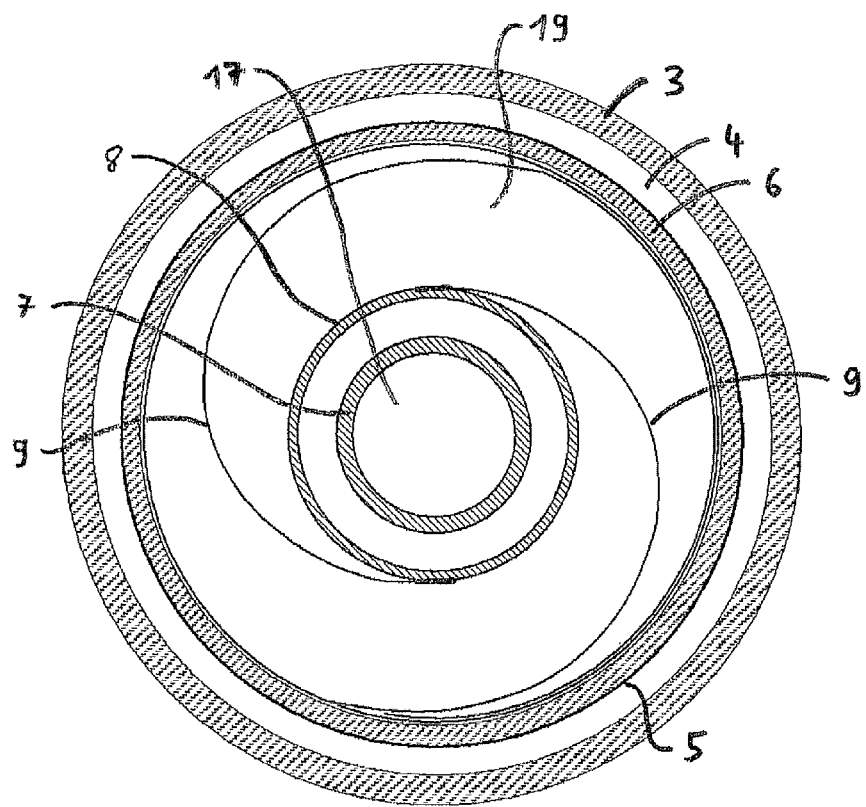
FIG. 1a shows a cross section through a heat exchanger according to an alternative embodiment of the invention, where the heat exchanger has two heat-conducting elements.

FIG. 1 shows a cross section through a heat exchanger according to one exemplary embodiment of the invention. The heat exchanger comprises a vacuum tube which is composed of two glass tubes 3 and 6 which are pushed one into the other and whose ends can be melted to one another on one side as in a thermos flask. The glass tubes 3 and 6 are each represented as circles composed of double dashes. In the gap 4 between the glass tubes 3 and 6 which extend concentrically to one another there is permanently a partial vacuum, in particular the pressure is advantageously less than 0.1 Pa, or in other words 0.1 microbar. The partial vacuum in gap 4 prevents in particular heat absorbed from the sun from being emitted again to the outside through convection.

The solar collector is usually composed of a plurality of heat exchangers which are arranged in parallel and/or in series, the distributor/collector 11 illustrated in FIG. 3 and the carrier frame 15 with the external reflector (not illustrated in the drawings). In the illustrated exemplary embodiment here, the heat exchanger comprises a forward flow pipe 7, a return flow pipe 8 and the spiral-shaped heat-conducting baffle 9. The heat-conducting baffle 9 is, as can be seen in FIG. 3, permanently connected to the return flow pipe 8 in the region 10. In the "N"-th solar collector in FIG. 3, the heat-conducting baffle 9 can be seen in an attachment region 10 on the return flow pipe 8.

The forward flow pipe 7 with the centric volume 17 conducts a relatively cold thermal carrier fluid. The return flow pipe 8, which is continuously connected to the collector/distributor 11, conducts heated thermal carrier fluid in the volume 18 which is annular in cross section. The distributor/collector 11 distributes and connects a plurality of sections of forward flow pipes 7 and return flow pipes 8 to the associated heat-conducting baffles 9 and vacuum tubes 3 and 6 in a hydraulic fashion according to "Tichelmann". The principle temperature profiles in the fluid volumes 17 and 18, that is to say warmer on the outside and colder on the inside and/or counter-current mode can also be set in an inverted fashion, that is to say colder on the outside and/or co-current mode. The fluid volume which is collected from the N collectors then leaves the collector housing 14 with the insulation at the collector output 13 after it has been individually combined with the reflectors from the carrier frames 15.

An absorber 5 is applied over the entire surface of the inner vacuum pipe 6, for example as a layer which is applied metallically. When there is a very good vacuum, like the pressures mentioned above in the microbar range, stagnation temperatures of more than 340 degrees Celsius are produced. The absorber can then be, in particular, metal oxide layers which are applied with plasma technology. When the vacuum is smaller, in which case only relatively low temperatures occur at the absorber 5, the absorber can be aluminum-coated paper, aluminized polyester materials, such as the material which is available from Dupont with the trade name "Mylar" or other absorber materials 5 which are arranged in this partial vacuum region (vacuum) of the gap 4. The, for example, solar thermal energy which is absorbed there is transmitted to the spiral-shaped heat-conducting baffle 9 through the glass of the inner pipe 6. This absorber layer 5 can also be applied to the inside of the pipe 6 and/or integrated in the spiral-shaped heat-conducting baffle.

The heat-conducting baffle 9 is a rectangular baffle which is preferably attached, for example hard-soldered, in the region 10 to the pipe 8. It is then rolled around the pipe 8 with prestress before they are both pushed together into the double pipe 3, 6 of the vacuum tube and fill the intermediate space 19. The prestress of the baffle presses it against the inner wall of the pipe 6 and causes it to rest on this inner wall over a certain range, for example 90 degrees or a quarter circle. A smaller area, but also in particular a larger area than this can be selected.

The baffle 9 bears against the inner glass surface over the largest possible angular range, for example over more than 355 degrees, preferably almost 360 degrees, for example 359 degrees, which is advantageous and avoids the undesired formation of condensate.

The heat-conducting baffle 9 which is thus spiral-shaped in cross section is pressed by its own spring force in a firm and surface-covering fashion over the entire glass surface of the pipe 6 so that optimum transmission of heat is achieved.

With this solution, the invention not only permits ideal conduction of heat but also by virtue of the homogeneous surface pressure against the inside of the vacuum inner tube 6 prevents cold bridges, and particularly very largely prevents the formation of condensation water which cause thick oxidation layers in systems according to the prior art, which in turn results in a reduction in the power of the conversion of solar energy.

A disadvantage of fixedly inserted heat-conducting baffles is the different coefficients of expansion of the individual materials (glass, various metals, etc.) so that gaps which lead to the aforesaid undesired effects are formed between heat-conducting baffles and pipes etc.

This results in a further advantage of the use of the heat-conducting baffle 9 in that the thermally-induced relative movement of the heat-conducting baffle 9 with respect to the adjacent faces ensures desirable cleaning, for example, of the glass surface of the inner pipe 6 and of the baffle face. This is correct in the heat-conducting baffle 9 which is attached in the region 10, but the heat-conducting baffle 9 can also be inserted in a floating fashion so that it is supported both on the inner pipe 6 and on the pipe 8 by means of the spring force. The volume 19 between inner pipe 6 and pipe 8 can, for example, be filled with ambient air or a protective gas or be under a partial vacuum.

Figure 4:
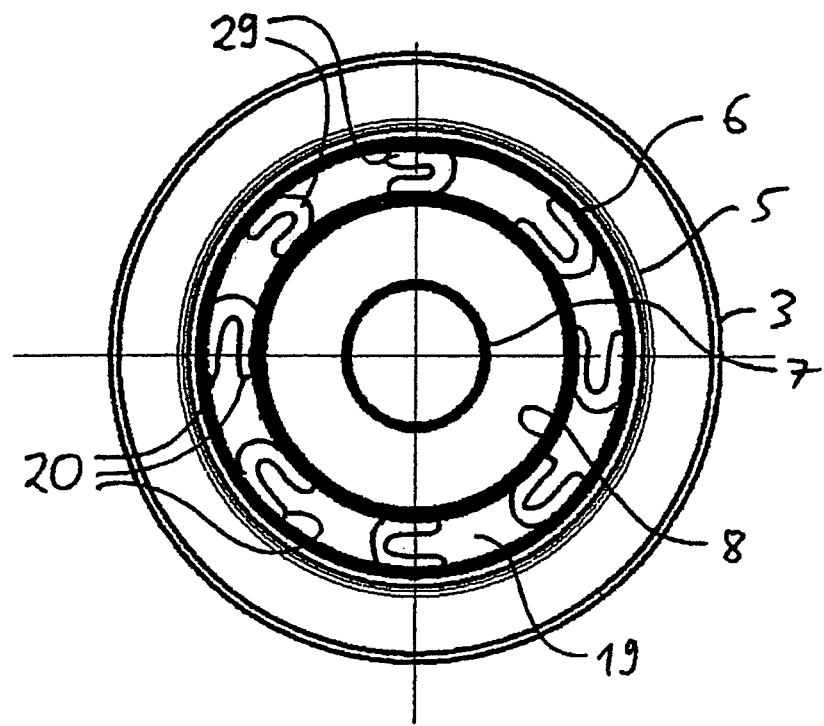
FIG. 4 shows a cross section through a heat exchanger according to a further exemplary embodiment of the invention.

FIG. 4 shows a cross section through a heat exchanger according to a further exemplary embodiment of the invention. Identical features are characterized in the figures by respectively identical reference symbols. The heat exchanger also comprises here a vacuum tube which is composed of two glass tubes 3 and 6 which are pushed one into the other. The absorber layer 5 is applied to the outside, but there are the same possibilities as in the exemplary embodiment according to FIG. 1.

The heat-conducting baffle 29 is composed in this exemplary embodiment of a plurality of rectangular baffles, eight baffles 29 here, which have two free ends 20 and thus a C shape which is preferably attached in the region 10 on the pipe 8. Each baffle 29 is inserted with prestress between the pipes 6 and 8 in order to fill the intermediate space 19. The prestressing of each baffle 29 presses it against the inner wall of the pipe 6 and causes it to rest on this inner wall over a certain range. A range of respectively 22.5 degrees is illustrated here. Larger or smaller regions than this can however also be selected. They also depend on the number of baffles used. However, the entire inside of the pipe 6 is advantageously also covered here. If N heat-conducting films 29 are provided, where N>=8, their free ends 20 can then bear in particular over an angular region of near to 360/N degrees, with presstress, against the aforesaid walls 6, 8.

The heat-conducting baffles 29 which are C-shaped in cross section are pressed by their own spring force in a firm and surface-covering fashion over the entire glass surface of the pipe 6 so that optimum transmission of heat is achieved.

Each heat-conducting baffle 29 can be attached on one side, for example on the inner pipe 8, but alternatively or additionally also on the inner wall of the pipe 6 so that one free end or both free ends 20 move with respect to the adjacent faces as a result of the thermally induced relative movement of the pipes 6, 8 and of the heat-conducting baffles 29 with respect to one another.

In an exemplary embodiment which is not illustrated in the drawings, two spiral-shaped heat-conducting films 9 are provided which are attached spaced apart from one another in an angular range of 180 degrees on the outer wall of the fluid-conducting pipe system 8 over an angular range 10, in particular in each case over an angular range of virtually 180 degrees. This results in two spirals which extend one inside the other, the transmission of heat being improved by the two bearing faces and the doubled line cross section for the conduction of heat. In this way it is also possible for three spiral-shaped heat-conducting films 9 to be provided over virtually 120 degrees in each case. When there are four spiral-shaped heat-conducting films 9, these are attached to the inner pipe 8 at an angular interval of, for example, 90 degrees. The length of the free end of each heat-conducting film 9 is, for example, such that it extends over, for example, an angular range of 540 degrees to 720 degrees, with the free end bearing on the inside of the pipe 6 or of an adjacent heat-conducting film 9.

FIG. 5 shows a cross section through a heat exchanger according to yet another exemplary embodiment of the invention, and FIG. 6 shows a longitudinal section along the line VI-VI in FIG. 5. The heat exchanger also comprises here a vacuum tube which is composed of two glass tubes 3 and 6 which are pushed one into the other. The absorber layer 5 is applied to the outside of glass tube 6. For example ambient air or a protective gas can be filled in the volume 19 between inner pipe 6 and pipe 8 or there can be a partial vacuum. The heat-conducting elements 39 of this exemplary embodiment are each composed of at least one heat-conducting metal rod 31, for example made of copper, which is soldered onto the outside of the return flow pipe 8 or connected in some other way. In FIG. 6 it is apparent that two metal rods 31 which are arranged at a distance from one another on a line of the pipe casing which extends parallel to the main axis of the heat exchanger are associated with each heat-conducting element 39. In each case a hollow sleeve 32 is fitted onto these metal rods 31 which are preferably composed of solid material, said sleeve 32 being preferably composed of the same material or having the same coefficient of thermal expansion. The sleeves 32 are attached at their end which respectively faces the rod 31 to a heat-conducting baffle 33, for example soldered to it. In the assembled state of the heat exchanger the heat-conducting baffle 33 bears against the inner wall of the pipe 6, and the heat-conducting baffle 33 is advantageously not pre-bent so that it presses in a sprung fashion against the wall 6. The spring effect is transmitted by the, in this case, two sleeves 32 by virtue of the fact that a spring element 34, for example a compression spring, is arranged in each sleeve 33, said compression spring being supported at one end on the heat-conducting baffle 33 and at the other end pressing against the tip of the rod 31. As a result, the heat-conducting baffle 33 is held securely in close contact with the wall 6, good conduction of heat into the pipe 8 being ensured by means of the connection through the sprung rod 31 and sleeve 32.

In the illustrated exemplary embodiment, in each case four rods 31 are attached to the pipe 8 at an angular interval of 90 degrees about the main axis of the heat exchanger at two locations along the aforesaid longitudinal axis. Four heat-conducting baffles 33 are then provided and the sleeves 32 are attached thereto at corresponding locations. The dimensions of the heat-conducting baffles 33 are such that after the insertion into the pipe 6 they fit snugly against almost the entire inner casing of the pipe 6, in other words the four heat-conducting baffles 33 take up an angular range of somewhat less than 90 degrees (=360/4 degrees). In order to carry out assembly, in each case the springs 34 are plugged into the sleeves, and the unit composed of the sleeve 32 and heat-conducting baffle 33 is plugged on and pressed in so that the pipe 6 can be pushed over the heat-conducting baffles 33 in the direction of the longitudinal axis. In this case, the inner pipes 7 and 8 are preferably secured over a longitudinal conical spring 35 which is supported at the longitudinal end of the pipe 6 and in a corresponding end depression in the pipe 8.

In the exemplary embodiment illustrated, the associated rods 31 are each arranged in the same longitudinal position along the pipe system 8. In other exemplary embodiments, these rods 31 can also be provided at different longitudinal distances from one another.

The rods 31 can also be attached to the heat-conducting baffle 33, and the sleeves 32 can be attached to the pipe system 8.

Instead of two times four attachment points 31, 32 and 34 and associated four heat-conducting baffles 33, three or four times four attachment points can also be provided. On the other hand, it is also possible to provide two or three heat-conducting baffles 33, each with two, three or more attachment points. More than four heat-conducting baffles 33 are generally not necessary for the purpose of conducting heat or making the heat exchanger stable.

In an exemplary embodiment which is not illustrated in the drawings, each individual rod 31—sleeve 32 connection with inserted spring element 34 can also be replaced by a single spring element in each case, which spring element is attached at one end to the pipe 8 and at the other end to the heat-conducting baffle 33. This spring element then observed the function of all three elements of an attachment point 31, 32, 34. The premounting is simply more complicated than in the exemplary embodiment illustrated in FIGS. 5 and 6 since here when assembly is carried out the spring elements must first be attached without them losing their elasticity.

The pipes 3 and 6 can in particular be composed of glass. The inner pipes 7 and 8 can be composed of metal, in particular copper, brass, aluminum or inox, the sequence indicating the technically most advantageous. Metals which are preferably good conductors of heat are selected for these pipes 7, 8. The heat-conducting baffle 9 or 29 is composed of a material which is a good conductor of heat, in particular of a metal such as copper, brass, aluminum or suitable types of inox or soft sheet titanium.

The invention claimed is:

1. A solar collector, comprising a manifold and a plurality of heat exchangers, wherein each heat exchanger comprises:
   a vacuum tube having an inner wall, wherein the vacuum tube is a glass tube;
   a fluid-conducting pipe system adapted to hold a fluid, wherein the fluid-conducting pipe system comprises an outer wall connected to the manifold;
   at least one heat-conducting element made of metal connecting the inner wall of the vacuum tube to the outer wall of the fluid-conducting pipe system provided in a volume between the outer wall of the fluid conducting pipe system and the inner wall of the vacuum tube, wherein the volume is filled with ambient air or a protective gas; and
   means for collecting and concentrating solar energy provided on a side of the inner wall of the vacuum tube facing away from the at least one heat-conducting element, wherein the outer wall of the fluid-conducting pipe system is a metal wall, wherein each heat-conducting element is a flexible metallic sheet and extends in a spiral shape along a cross-section of the heat exchanger, covers an angle of at least 450 degrees, is attached at the outer wall of the fluid-conducting pipe system and prestressed against the inner wall of the vacuum tube and the fluid-conducting pipe system, such that the outer wall of the fluid-conducting pipe system is centered concentric to the inner wall of the vacuum tube, wherein the vacuum tube is indirectly resiliently connected to the-manifold by means of the prestressed heat-conducting elements and the fluid-conducting pipe system, and wherein the vacuum tube is suspended on the at least one heat-conducting element without physical contact with the manifold or the fluid conducting pipe.

2. The heat exchanger as claimed in claim 1, wherein the heat exchanger has two heat-conducting elements, wherein two of the heat-conducting elements are spaced apart from one another in an angular arrangement on an outer wall of the fluid-conducting pipe system over an angular range between 350 to 359 degrees or between 90 and 179 degrees.

3. The heat exchanger as claimed in claim 1, wherein the fluid-conducting pipe system comprises an outer volume and an inner volume operable in a counter-current mode.

4. The heat exchanger as claimed in claim 1, wherein the fluid is a heat-conducting fluid, and the fluid is contained within the inner tube.

5. The heat exchanger as claimed in claim 1, wherein the at least one heat-conducting element is hard-soldered at the outer wall of the fluid-conducting pipe system.

6. A method for making a solar collector having at least one heat exchanger, the method comprising the steps of:
   providing a vacuum tube having an inner wall, wherein the vacuum tube is a glass tube, and comprising means for collecting and concentrating solar energy provided on a side of the inner wall of the vacuum tube;

providing a fluid-conducting pipe system adapted to hold a fluid, wherein the fluid-conducting pipe system comprises an outer wall being a metal wall;

providing at least one heat-conducting element made of a flexible metallic sheet having the length of the outer wall of the fluid-conducting pipe system;

at least one heat-conducting element made of metal connecting the inner wall of the vacuum tube to the outer wall of the fluid-conducting pipe system provided in a volume between the outer wall of the fluid conducting pipe system and the inner wall of the vacuum tube, wherein the volume is filled with ambient air or a protective gas; and attaching the heat-conducting element along its length at the outer wall of the fluid-conducting pipe system;

wrapping the heat-conducting element around the outer wall of the fluid-conducting pipe system;

introducing the wrapped heat-conducting element and fluid-conducting pipe system into a volume between the outer wall of the fluid conducting pipe system and the inner wall of the vacuum tube, wherein the volume is filled with ambient air or a protective gas; and releasing the free end of the heat-conducting element, so that the heat-conducting element connects the inner wall of the vacuum tube to the outer wall of the fluid-conducting pipe system and extends in a spiral shape along a cross-section of the heat exchanger, covering an angle of at least 450 degrees, and is pre-stressed against the inner wall of the vacuum tube and the fluid-conducting pipe system; and suspending the vacuum tube on the at least one heat-conducting element without physical contact with the manifold or the fluid conducting pipe.

7. The heat exchanger as claimed in claim 1, wherein the volume between the outer wall of the fluid conducting pipe system and the inner wall of the vacuum tube is under partial vacuum.

* * * * *

UNITED STATES PATENT AND TRADEMARK OFFICE
CERTIFICATE OF CORRECTION

PATENT NO. : 8,528,542 B2  Page 1 of 1
APPLICATION NO. : 10/592982
DATED : September 10, 2013
INVENTOR(S) : Orhan Üstün It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1014 days.

Signed and Sealed this
Fifteenth Day of September, 2015

Michelle K. Lee
*Director of the United States Patent and Trademark Office*